(12) United States Patent
Suijlen et al.

(10) Patent No.: US 8,256,298 B2
(45) Date of Patent: Sep. 4, 2012

(54) MEMS PRESSURE SENSOR

(75) Inventors: Matthijs Suijlen, Eindhoven (NL); Jan Jacob Koning, Wijchen (NL); Herman Coenraad Willem Beijerinck, The Hague (NL)

(73) Assignee: NXP B.V., Eindhoven (NL)

( * ) Notice: Subject to any disclaimer, the term of this patent is extended or adjusted under 35 U.S.C. 154(b) by 203 days.

(21) Appl. No.: 12/900,398

(22) Filed: Oct. 7, 2010

(65) Prior Publication Data
US 2011/0107838 A1 May 12, 2011

(30) Foreign Application Priority Data
Oct. 7, 2009 (EP) .................................... 09172478

(51) Int. Cl.
*G01L 11/04* (2006.01)
(52) U.S. Cl. ........................................... 73/702; 73/704
(58) Field of Classification Search .................... 73/702, 73/703, 704
See application file for complete search history.

(56) References Cited

U.S. PATENT DOCUMENTS

| | | | |
|---|---|---|---|
| 5,452,268 A * | 9/1995 | Bernstein | 367/181 |
| 5,528,939 A | 6/1996 | Martin et al. | |
| 5,844,141 A * | 12/1998 | Stansfeld | 73/702 |
| 7,059,192 B2 | 6/2006 | Correale et al. | |
| 2004/0250625 A1 | 12/2004 | Kogan | |
| 2005/0126295 A1 | 6/2005 | Correale et al. | |
| 2010/0158280 A1* | 6/2010 | Coronato et al. | 381/174 |
| 2012/0032555 A1 | 2/2012 | Koning et al. | |

FOREIGN PATENT DOCUMENTS

| | | |
|---|---|---|
| EP | 1 722 210 A2 | 11/2006 |
| EP | 1 808 658 A2 | 7/2007 |
| WO | 2008/149298 A1 | 12/2008 |

OTHER PUBLICATIONS

S. Bendida, et al.: 'Temperature Stability of a Piezoresistive MEMS Resonator Including Self-Heating,' Microelectronics Reliability, 48, pp. 1227-1231, (2008).
M. A. G. Suijlen, et al.: 'Squeeze Film Damping in the Free Molecular Region with Full Thermal Accommodation,' Proc. Eurosensors XXII, (2008).
M. K., Andrews, et al.: 'A Resonant Pressure Sensor Based on a Squeezed Film of Gas,' Sensors and Actuators A 36, pp. 219-226, (1993).
Extended European Search Report for Patent Appln. No. 09172478.1 (Feb. 2, 2010).
Ono, M. et al. "Design and Performance of a Quartz Oscillator Vacuum Gauge with a Controller," J. Vac. Sci. Technol. A 3(3), pp. 1746-1749 (1985).
Melvas, P. et al. "A Surface-Micromachined Resonant-Beam Pressure-Sensing Structure," J. of MicroelectroMechanical Systems, vol. 10, No. 4, pp. 498-502 (Dec. 2001).
Kurth, S. "A Micromachined Pressure Gauge for the Vacuum Range Based on Damping of a Resonator," Proc. SPIE 4559, pp. 103-111 (2001).
Wilfert, S. et al. "Miniaturized Vacuum Gauges", J. Vac. Sci. Technol. A, 22(2), pp. 309-320 (Mar. 4, 2004).

* cited by examiner

*Primary Examiner* — Lisa Caputo
*Assistant Examiner* — Punam Roy

(57) ABSTRACT

A MEMS pressure sensor for sensing the pressure in a sealed cavity of a MEMS device, comprises a resonant MEMS device having a pressure sensor resonator element which comprises an array of openings. The resonant frequency of the resonant MEMS device is a function of the pressure in the cavity, with resonant frequency increasing with pressure. Over the pressure range 0 to 0.1 kPa, the average change in frequency is at least $10^{-6}$/Pa. The invention is based on the recognition that for fast oscillation, the elastic force causes the resonance frequency to shift. Therefore, it is possible to sense the pressure by a device with resonance frequency that is sensitive to the pressure.

15 Claims, 6 Drawing Sheets

MEMS PRESSURE SENSOR

This application claims the priority of European patent application no. 09172478.1, filed on Oct. 7, 2009, the contents of which are incorporated by reference herein.

BACKGROUND OF THE INVENTION

In the process of MEMS manufacturing, microstructures are usually encapsulated in a sealed micro cavity to maintain vacuum conditions for a proper operation of the MEMS device. Micro cavities have a very small volume (typically 200×200×2 µm$^3$) and the vacuum will be easily spoiled by a leak or out-gassing. It is therefore important to have a means to monitor the pressure in the micro cavity either during product release, during qualification of the production process, or even during operation of the resonant MEMS device.

FIG. 1 shows the pressure dependency of the oscillation amplitude (S12) for a bulk mode timing resonator with a frequency of 25.8 MHz. For pressures above 10 mbar (1 kPa) resonance amplitude starts to deteriorate.

High frequency (HF) resonators (up to 100 MHz but typically lower for bending mode resonators than for bulk mode resonators) suitable as timing devices for MEMS oscillators have limited Q factor due to air damping when the pressure range is above 1 mbar, as can be seen in FIG. 1. A resonator functioning as a timing device should give constant performance (stable frequency and sufficient amplitude for the oscillation), so that operation in a vacuum is desired. A pressure sensor to test the cavity vacuum of MEMS resonators in batch production should therefore be more sensitive to the lower pressures than the HF timing device itself. It should further be integrated in the MEMS micro cavity if possible.

Several concepts of pressure sensors are known, for instance:

Pirani heat wire, based on heat conductivity of gas;
Diaphragm, based on membrane deflection;
Hot and cold cathode, based on ionization of gas. For high-aspect ratio miniaturization like in MEMS devices, however, extremely high magnetic fields will be necessary to reach sufficiently long electron paths and thus sensitivity to the pressure of the gas;
Resonant cantilevers and tuning forks of quartz and silicon, based on damping forces of the gas.

The pressure dependence of the performance of resonant MEMS devices, like resonators and gyroscopes, is the result of damping effects. The equation of motion is:

$$m^*a + b^*v + k^*x = F \quad (1)$$

in which:
m is the effective resonator mass;
a is the acceleration;
b is the damping coefficient;
v is the velocity;
k is the spring constant;
x is the displacement; and
F the driving force such as the electrostatic force over the electrode gap.

$$\text{For a solution } x = A\sin(\omega^* t), \quad (2)$$

The potential energy term of the spring has a magnitude proportional to $$m^* A^* \omega^2 \quad (3)$$

and the same holds for the kinetic energy of the force after substitution of $$\omega^2 = k/m. \quad (4)$$

While the damping term has a magnitude of $$b^* A^* \omega. \quad (5)$$

If damping term (5) is comparable to kinetic energy term (3) then damping is considerable. For higher frequency devices damping is comparatively lower. Based on this principle, pressure sensors have been derived that measure changes in amplitude or dissipation. However, the motional resistance of mechanical resonators is not very stable over time, which makes these sensors unreliable in measuring absolute pressure over time, particularly low pressures.

There is therefore a need for pressure sensor approach which is more stable and can be easily implemented using the same technology as the MEMS device for which the pressure sensing is desired.

SUMMARY OF THE INVENTION

According to the invention, there is provided a MEMS pressure sensor for sensing the pressure in the vicinity of a MEMS device, comprising:

a monolithic resonant MEMS device having a pressure sensor resonator element which comprises an array of openings, wherein the resonant frequency of the resonant MEMS device is a function of the pressure in the vicinity of the pressure sensor with resonant frequency increasing with pressure, such that over the pressure range 0 to 0.1 kPa, the average relative change in frequency is at least $10^{-6}$/Pa.

A relative change in frequency of at least $10^{-6}$ in this context means that the frequency increases from f to f+Δf, where Δ is at least $10^{-6}$. This may also be considered as a fractional change in frequency.

This device shows an increasing resonant frequency if the pressure increases. The gas in the cavity acts as an additional spring and causes stiffening. Preferably, narrow etch slits and plate perforations are used to prevent the gas from escaping the resonator gap during the oscillations. The resonant frequency shift of the damped MEMS resonator is in the millibar (1 mbar=0.1 kPa) range (Knudsen regime).

This invention is based on the recognition that for fast oscillation, the elastic force causes the resonance frequency to shift. Therefore, it is possible to sense the pressure by a device with resonance frequency that is sensitive to the pressure.

The openings of the pressure sensor resonator element preferably have a maximum opening dimension in the range 0.2 µm to 1 µm and an average pitch in the range 5 µm to 20 µm. The pressure sensor resonator element can have a thickness in the range 1 µm to 3 µm and an area in the range 100 µm$^2$ to 40,000 µm$^2$.

These parameters are used to tune the response of the pressure sensor resonator element to give the desired pressure dependency of the resonant frequency.

The average relative change in frequency is preferably at least $10^{-6}$/Pa over the pressure range 0 to 0.01 kPa, and even over the pressure range 0 to 0.001 kPa. Thus, pressure sensing becomes possible at extremely low pressures.

Over the pressure range 0 to $10^{-5}$ kPa ($10^{-4}$ mbar), the quality (Q) factor preferably decreases monotonically with increasing pressure. Thus, the Q factor can also be used as a measurement parameter, based on amplitude sensing.

The pressure sensor can further comprise means for measuring an electrical resistance of the pressure sensor resonator element to function as a Pirani element.

The resonant frequency can be read out by piezo-resistive, capacitive or optical sensing methods. Also, a PLL oscillator can be provided for tracking the resonant frequency and/or phase with changing pressure.

The invention also provides a MEMS device comprising a resonant MEMS element within an encapsulated cavity and a pressure sensor of the invention for measuring the cavity pressure.

In one example, separate resonator elements can be used; one for the MEMS device (e.g. resonator or oscillator) and one for the pressure sensor. However, the resonant MEMS element (of the MEMS device) can comprise a MEMS resonator element controlled to vibrate in a lateral mode (bulk mode shape), and wherein the same MEMS resonator element is controlled to vibrate in a vertical resonant mode (out-of-plane mode shape) to form the resonant element of the MEMS pressure sensor. In this way, a single resonator element can perform the MEMS device function as well as the pressure sensor function. The resonator element when controlled to vibrate in a lateral mode then can comprises a bulk mode resonator functioning as a timing device or frequency reference.

The invention also provides a method of measuring a pressure below 0.1 kPa in the vicinity of a MEMS device, comprising:

monitoring the resonant frequency of a monolithic resonant MEMS device having a pressure sensor resonator element which comprises an array of openings, wherein the resonant frequency of the resonant MEMS device is a function of the pressure in the cavity with resonant frequency increasing with pressure, such that over the pressure range 0 to 0.1 kPa, the average relative change in frequency is at least $10^{-6}$/Pa.

This pressure sensing method can be used to determine a defect in a MEMS device having a sealed cavity.

BRIEF DESCRIPTION OF THE DRAWINGS

Examples of the invention will now be described in detail with reference to the accompanying drawings, in which.

DETAILED DESCRIPTION OF EMBODIMENTS

As mentioned above, it has been recognised that monitoring amplitudes or dissipation in a resonator signal can be used to indicate pressure. This invention is based on a different monitoring mechanism which affects the resonance frequency. If the gas film within the resonator structure can not escape fast enough, it will contribute to the spring constant k.

It can be assumed that the mean free path of the gas molecules is larger than the device dimensions, (i.e. >100 µm), for pressures in the range of 0.1 kPa, namely within the regime of a Knudsen gas, where viscosity is not considered.

In the equation of motion, Equation (1), the damping coefficient b and spring constant k can be decomposed to a contribution from the (silicon) structure $b_{mat}$ and a contribution due to gas damping $b_{gas}$.

$$b = b_{mat} + b_{gas} \tag{6}$$

$$k = k_{mat} + k_{gas} \tag{7}$$

The damping coefficient $b_{gas}$ and elastic coefficient $k_{gas}$ are given by:

$$b_{gas} = \left(\frac{pA\tau}{d}\right)\frac{1}{1+(\omega\tau)^2} \tag{8}$$

$$k_{gas} = \left(\frac{pA}{d}\right)\frac{(\omega\tau)^2}{1+(\omega\tau)^2} \tag{9}$$

in which:

p is the gas pressure inside the device;

A, the frontal area of the resonator;

d, the gap width of the resonator to the actuation electrode;

ω, the resonance frequency of the resonator; and

τ, the diffusion time of the gas inside the device cavity.

This is demonstrated in M. A. G. Suijlen, J. J. Koning, M. A. J. van Gils, H. C. W. Beijerinck, *Squeeze film damping in the free molecular region with full thermal accommodation*, Proc. Eurosensors XXII, 2008.

This diffusion time is the time for a molecule to escape from the resonator gap in a rarefied gas where the mean free path is much larger than the gap width.

Figure 1:
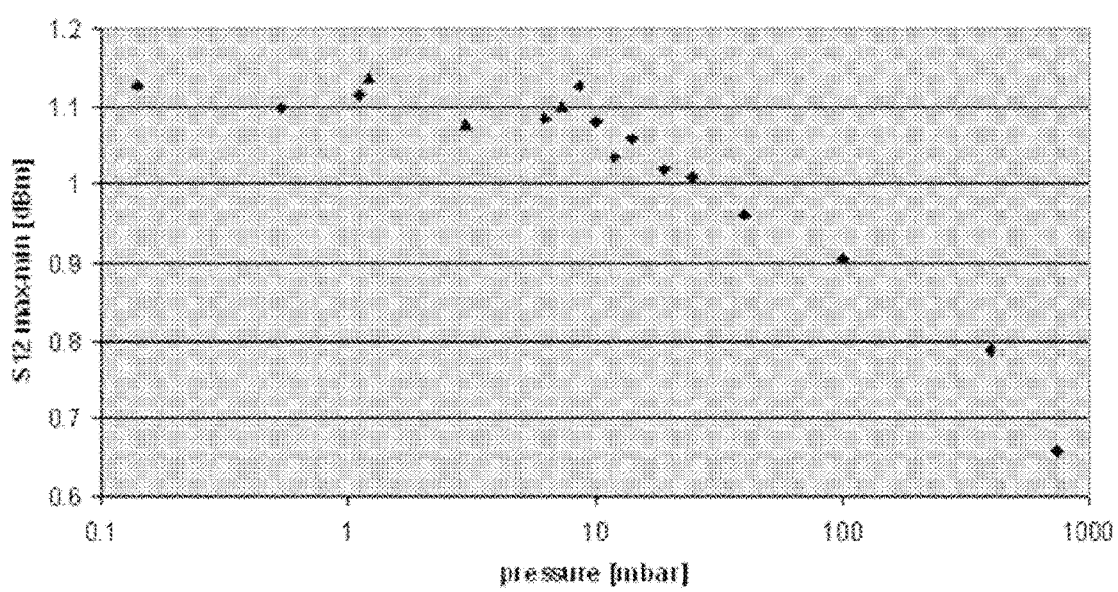
FIG. 1 shows the pressure dependency of the oscillation amplitude for a bulk mode timing resonator.
Figure 2:
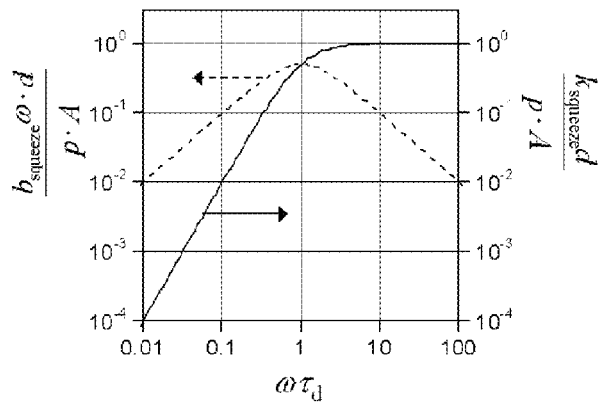
FIG. 2 shows the frequency dependency of the elastic force constant and the damping constant.

In a plot of these constants versus frequency ω the character of the squeeze film interaction can be seen, as shown in FIG. 2.

FIG. 2 shows the frequency dependence of the elastic force constant (solid line) and the damping constant (dotted line) due to the squeeze film interaction. The indices "squeeze" are used referring to commonly used squeeze film damping, while in the formulae "gas" is used, here meaning the same.

For very slow oscillation, ωw<<1/τ, it manifests itself as pure amplitude damping force.

Figure 3A:
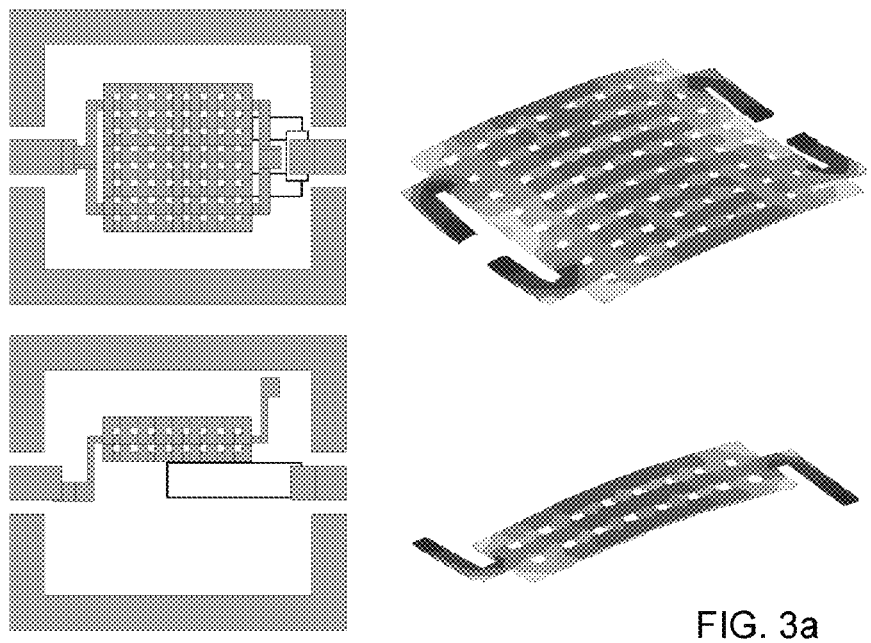
FIG. 3a shows two examples of MEMS resonators in which the damping force dominates over the elastic force causing a diminishing amplitude as shown in the graph of FIG. 3b.
Figure 3B:
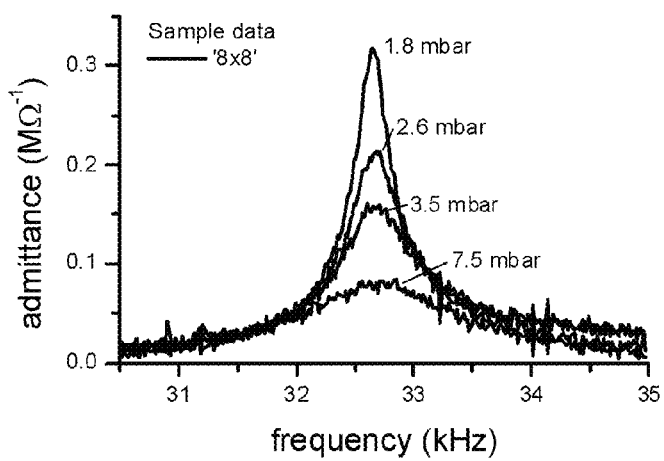

Examples of MEMS resonators with this characteristic are shown in FIG. 3a. The damping force (amplitude b*ω) dominates over the elastic force causing a diminishing amplitude (see resonance peaks of FIG. 3b). Thus, pressure can be estimated from an amplitude measurement. This method has a drawback as amplitude is not always reproducible and the sensitivity above 1 mbar becomes limited as is shown in FIG. 3b. Thus, the example of FIG. 3 is a device where frequency is not dependent on pressure because dissipation (amplitude b*ω) dominates over the kinetic energy. This is the ω*τ<<1 regime (see FIG. 2) where air can escape through the plate perforations easily.

For fast oscillation, $\omega \gg 1/\tau$, the damping force becomes an elastic force which adds to the spring constant, as seen in equation (7). The mechanical device oscillates too fast for the gas to escape.

The invention is based on the link between the damping force and the pressure, and the effect of the resulting change in spring constant on the resonant frequency.

The invention provides a monolithic resonant pressure sensor to sense the pressure in a micro cavity of a bulk mode resonant MEMS device, such as a HF timing resonator. The pressure sensor is more sensitive to lower pressures than the HF timing resonator itself. This invention can be implemented as a separate MEMS resonator in the cavity or else the MEMS timing resonator itself can be used as pressure sensor by using a different resonant mode. This can be the vertical resonant mode (flex mode or bending mode) of the resonant MEMS device, which is normally operated in lateral bulk mode resonance. This avoids having a second MEMS device in the same micro cavity.

The resonant frequency is used for sensing the pressure, and this resonant frequency can be in the range of several hundreds of kilohertz or lower. The pressure sensor of the invention relies on the strong elastic force of the gas pressure that causes the frequency to shift with pressure.

Over the pressure range 0 to 0.1 kPa, the average relative change in frequency is at least a factor of $10^{-6}$/Pa. Thus, over the range 0 to 0.1 kPa, there is a relative change by a factor of at least $10^{-4}$, i.e. 100 ppm. The steeper the slope of fractional change versus pressure, the easier the determination of pressure. Preferably, over the range 0 to 0.1 kPa, the average change in frequency can be a factor of more than $10^{-5}$/Pa and even as high as $10^{-4}$/Pa, i.e. over the range 0 to 0.1 kPa, there is a change by a factor of more than 1000 ppm as high as 10,000 ppm respectively.

The readout of the resonance signal from the pressure sensor can be by different conventional methods. Essentially there are two possible approaches:

Resonator type, where the resonance can be probed with an impedance analyzer to track the resonant frequency; or Oscillator type, where the output of a feed-back amplifier or PLL can be used to track the resonant frequency.

Read-out of the resonator displacement is possible by various mechanisms such as capacitive, piezo-resistive or optical read-out. The most common is a capacitive read-out system.

In one implementation a MEMS device comprises a resonant MEMS element of the main device within an encapsulated cavity which is controlled to vibrate in a lateral mode (bulk mode). The pressure sensor for measuring the cavity pressure uses the same MEMS resonator element but controlled to vibrate in a vertical resonant mode.

To excite the vertical resonant mode, a top electrode is provided in addition to the lateral drive electrodes for the bulk mode. Alternatively, a substrate contact beneath the resonator element can be used for excitation.

Figure 4:
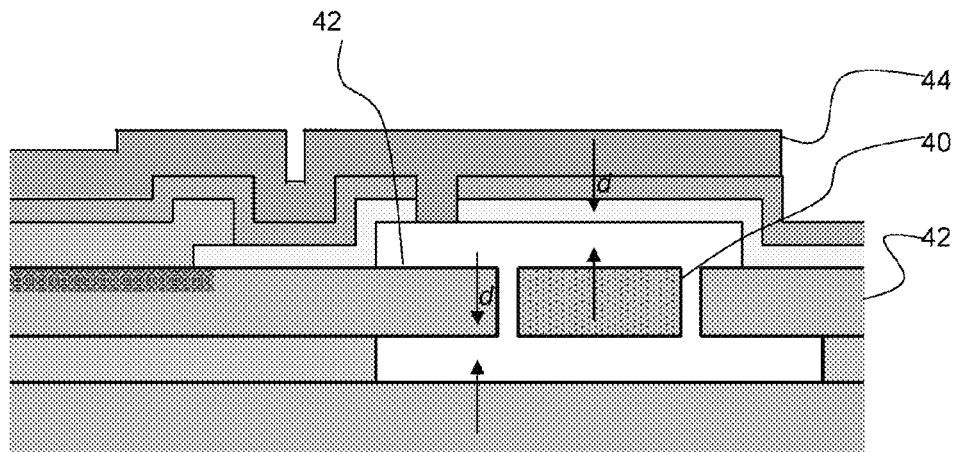
FIG. 4 shows an example of MEMS pressure sensor in silicon with a top electrode.

FIG. 4 shows schematically an example of structure suitable for implementing the pressure sensor of the invention.

The resonator element 40 is actuated by lateral electrodes 42 for the bulk mode, and by a top electrode 44 for the vertical pressure sensing mode. The top electrode 44 can be manufactured by capping the resonator with an electrically insulating hermetic film 46 and depositing a metal layer 44 on top of that.

The frequency response in the vertical mode is dependent on the design of the resonator element 40, in particular the orifices in the resonator element, as these influence the damping characteristics. Assuming a uniform array of openings, the table below shows example manufacturing specifications for the MEMS pressure sensor in silicon.

| Parameter | Fixed/Variable | Minimum value | Maximum value |
| --- | --- | --- | --- |
| Frontal resonator area (A) | Variable | $10 \times 10$ μm² | $160 \times 160$ μm² |
| Resonator thickness (t) | Fixed | 1.5 μm | 1.5 μm |
| Gap width (d) | Fixed | 1.0 μm | 1.0 μm |
| Etch hole size (l) | Variable | 0.2 μm | 1 μm |
| Etch hole pitch (h) | Variable | 5 μm | 10 μm |

The fixed elements are fixed in the sense that they are determined by the process used, whereas the variable parameters can be selected by suitable masks within the process. However, different values are also possible for the "fixed" parameters, for example resonator element thickness in the range 1 μm to 3 μm, gap width above and below the resonator element in the range 1 μm to 3 μm. The area can generally be in the range 100 μm² to 40,000 μm².

Figure 5:
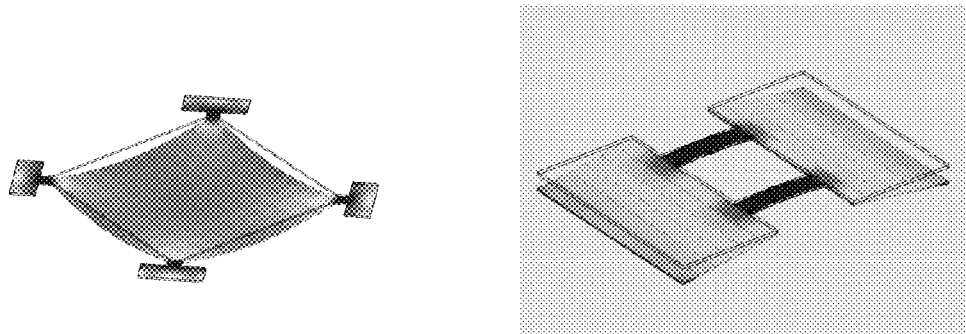
FIG. 5 shows square plate and dog bone shaped resonators as typically applied in HF timing devices and which can be used as pressure sensors of the invention.

FIG. 5 shows square plate and dog bone shaped resonators as typically applied in HF timing devices. The figure shows schematically the deflection resulting from operation in the vertical flex mode instead of lateral bulk mode, in order to implement an example of the pressure sensitive sensor design of the invention.

Figure 6:
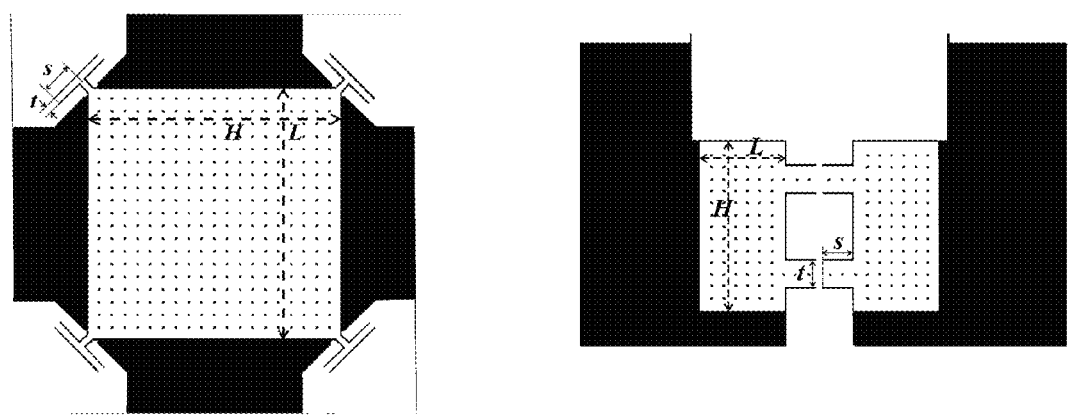
FIG. 6 shows a more detailed layout of the square plate and dog bone shaped resonators of FIG. 5.

FIG. 6 shows as more detailed layout of square plate and dog bone shaped resonators in silicon of FIG. 5. The dark areas represent the electrodes for resonator operation in the lateral bulk mode.

The pressure sensor can be used for sensing the internal cavity pressure, or for sensing the ambient pressure before the cavity is closed, or for sensing ambient pressure if the cavity is not closed. For example, for detection of external pressure, venting holes through the substrate can be provided, or the step of closing the etch holes in a sealing process can be omitted. Thus, the invention can be used to form a device for external pressure sensing in the millibar range.

The characteristics of these devices are now shown, based on an analysis of uncapped resonator examples (i.e. without the capping layer 44 of FIG. 4). This means the microcavity is open so that the pressure applied externally to a vacuum chamber can be controlled, and varied as a control parameter, thereby enabling the characteristics of the pressure sensor to be derived.

Figure 7:
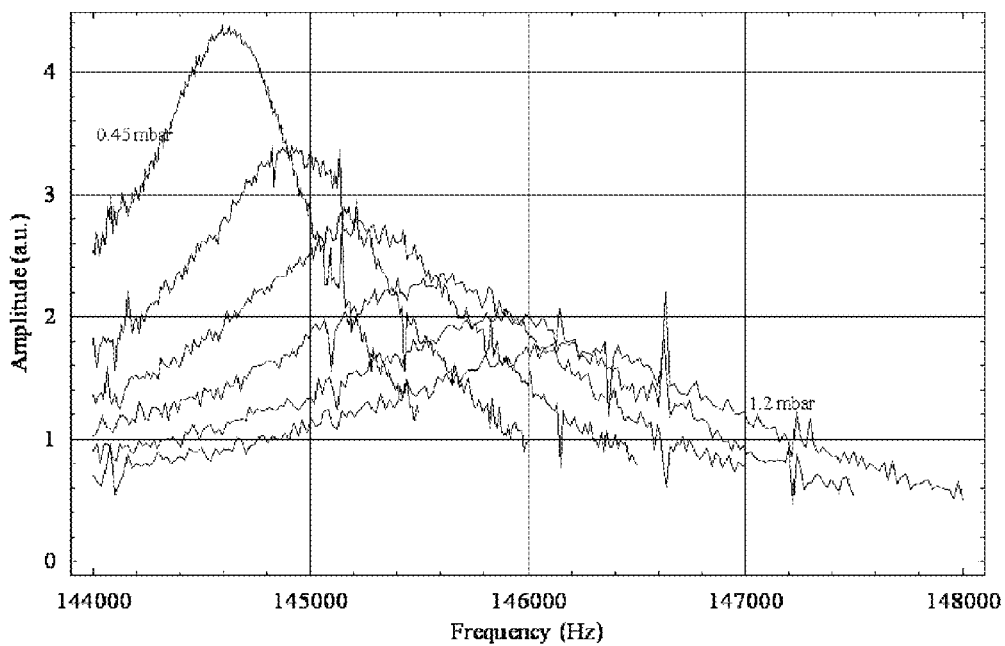
FIG. 7 shows the frequency characteristic of the amplitude for the square plate resonator example of FIG. 6 for different pressures.

FIG. 7 shows the frequency characteristic of the amplitude for a square plate resonator for different pressures. The frequency increases with pressure, but the amplitude of the peak decreases.

Figure 8:
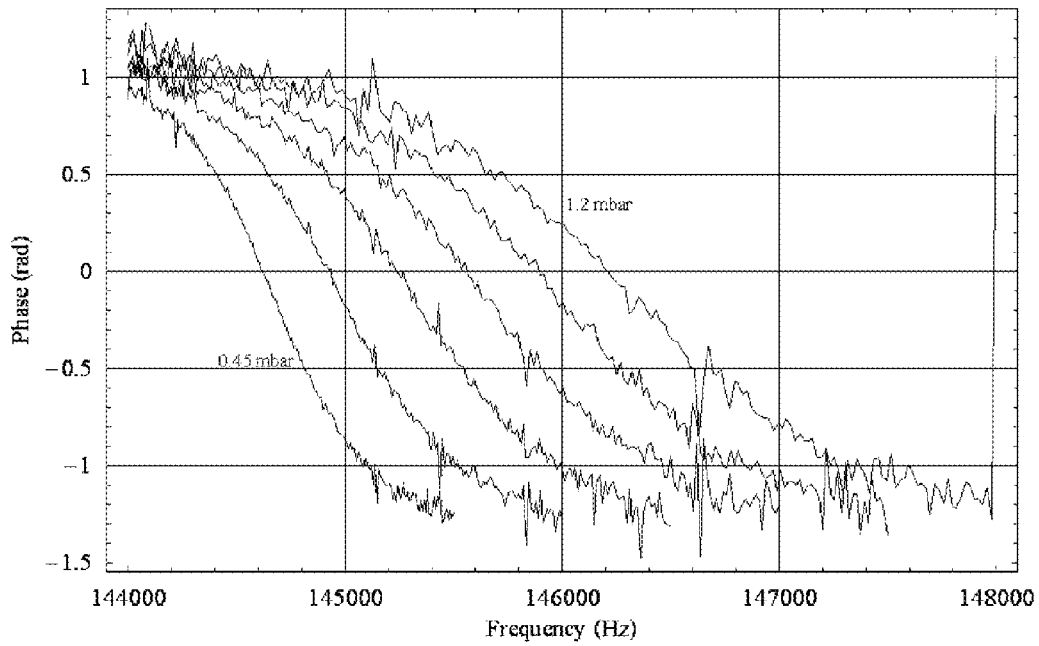
FIG. 8 shows the frequency characteristic of the phase for the square plate resonator example of FIG. 6 for different pressures.

FIG. 8 shows the frequency characteristic of the phase for the square plate resonator for different pressures.

Figure 9:
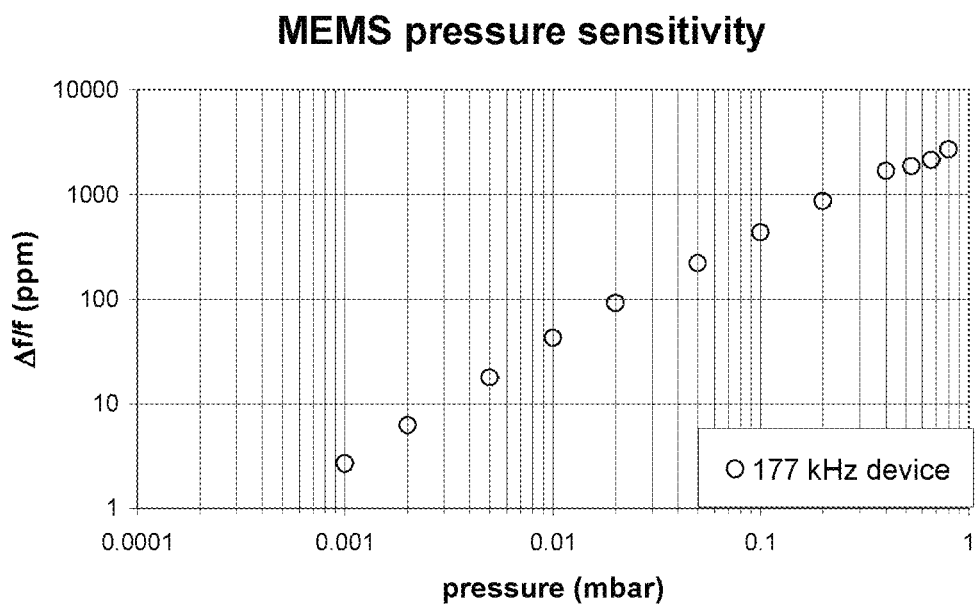
FIG. 9 shows the pressure sensitivity to a frequency shift as measured on the dog bone shaped resonator example.

FIG. 9 shows the resulting pressure sensitivity based on measured for frequency shift as measured on the dog bone shaped resonator example.

Above 0.4 mbar (0.04 kPa) the pressure sensitivity results on the dog bone resonator example are measured with 5 volts instead of 2 volts bias voltage, as damping reduces amplitude above this pressure. Thus, the bias voltage can be used to compensate for the diminishing amplitude of the frequency peak as pressure increases. This results in a minor offset in FIG. 9 at around 0.4 mbar. Without this slight offset (which can be seen in FIG. 9), the function is almost perfectly linear.

In order to obtain a unique relationship between pressure and frequency sensitivity ($\Delta f/f$), the electrode bias amplitude could be adjusted.

Figure 10:
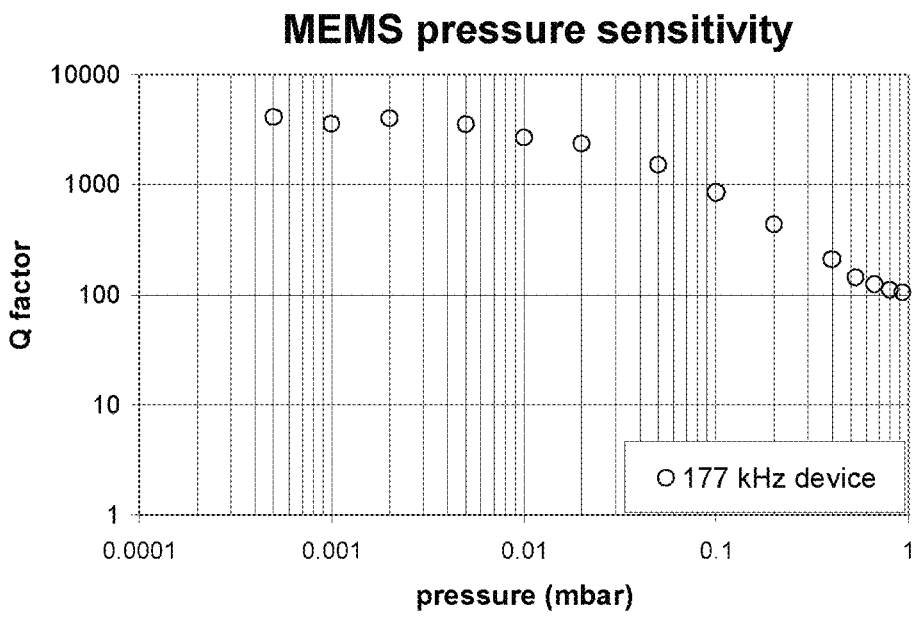
FIG. 10 shows the pressure sensitivity of the Q factor as measured on the dog bone shaped resonator example.

FIG. 10 shows the pressure sensitivity for the quality factor as measured on the dog bone shaped resonator example.

This shows that at higher pressures, amplitude monitoring may be preferred in addition to or instead of frequency monitoring.

Pressure monitoring on wafers at wafer-level pre-test could make use of an impedance analyzer to determine the resonant frequency of several resonators on the wafer. This tool is standard available in test fabs.

Due to process spread, a few hundred ppm frequency spread is expected on the wafer. The dog bone shaped resonator example shows a pressure-to-frequency sensitivity of some $4 \times 10^{-5}$/Pa (4000 ppm/mbar).

If an arbitrary process spread of 500 ppm is assumed, then a measured spread in pressure of less than 0.02 kPa (0.2 mbar) will result. Values outside this range will be rejected by the cavity pressure test. The resonance of the high frequency timing mode then also may not work and therefore the entire resonator device could be defective. In this way the impedance analyzer test of the pressure-sensing mode on individual devices is a sensitive test for detecting malfunctioning devices on the wafer. The method is thus useful for identifying defective devices or micro cavities at wafer level, preventing extra cost for assembly and packaging.

For qualification of the micro cavity hermeticity and out-gassing, a limited time span of six weeks would be desirable. Required life time span can be ten years (about 600 weeks) so the qualification test should be hundred times more sensitive to leakage and out-gassing than the required pressure of 1 kPa of the HF timing device. By the sensitivity of FIG. 9 the ability of this method for use as a reliability test is clear.

The sensor can be used for sensing external pressure in the range of 0.05 Pa to 0.1 kPa in the case of an open package. This can be used for pressure sensor calibration, or enables the use of the sensor for external pressure monitoring, for example for monitoring process conditions. This could be combined with a pressure sensor calibration. The device will not be damaged if suddenly exposed to 1 atmosphere (approx 1 kPa), unlike current membrane pressure sensors for the 1 mbar range.

As mentioned above and shown in FIG. 10, the Q factor sensitivity can also be used as pressure read-out. This might require regular calibration, as the amplitude of the resonator might not be very stable over time.

The pressure sensor can also be used as a Pirani element. By defining a current through the device, passing via the anchors through the resonator, the resonator becomes heated. The thermal resistance of the suspended supports is due to the silicon. As the supports are narrow (2 μm in our case) thin (1.5 μm) and have a length of 3 μm (variable design, can be shorter or longer), the heat resistance becomes large (about 10000 K/Watt). The temperature of the resonator can be inhomogeneous. Typical for a Pirani element is that the heat conductivity of the gas causes the hot element to be cooled as a function of gas pressure.

The resonant frequency depends on the gas pressure, so that the resonator beam can be used as a Pirani element, particularly suitable for use at high pressures.

Figure 11:
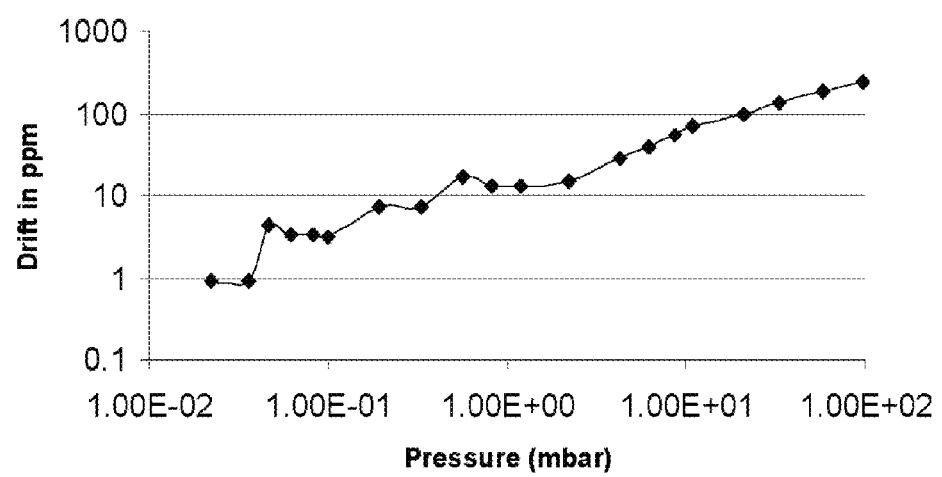
FIG. 11 shows the resonant frequency drifting away from low pressure reference frequency if the pressure is increased.

FIG. 11 shows the resonant frequency drifting away from the low pressure reference frequency if the pressure is increased.

For high pressures as shown in FIG. 11, when the resonance has become very broad, measurement of the resistance can also be used to sense the temperature of the Pirani element, while the resonator does not need to resonate at all. The resistance is temperature dependent, and it will vary depending on the heat conductivity of surrounding gas. The relation of resistance and temperature has been published in S. Bendida, J. J. Koning, J. J. M. Bontemps, J. T. M. van Beek, D. Wu, M. A. J. van Gils and S. Nath, *Temperature stability of a piezoresistive MEMS resonator including self-heating*, Microelectronics Reliability, 48 (2008), pp 1227-1231.

This extends the sensitive range of the pressure sensor device to high pressures.

Using the self-heating of the device, the temperature of the spring damped pressure sensor can be stabilised to reduce the sensitivity of the pressure sensor.

The invention is of particular interest for probing of vacuum pressure in individual device sealed cavities, enabling quality testing of every micro cavity pressure without the need of extra pressure sensor designs.

The sensor enables a wafer-level MEMS device test of HF resonators by measuring the vertical resonant mode with an impedance analyzer. Wafer-level tests are cost saving as compared to final testing after packaging, as they require less test time, less package handling and the packaging and final test costs are prevented for devices that can be disqualified at wafer-level test. Package and test cost might amount to some 15% of the total cost.

A fully capacitive system is advantageous as it consumes less power than comparable thermal/Pirani sensors and/or hot filaments.

The invention uses the spring effect of the damping. The frequency shift does not depend on the amplitude detected. Therefore, the pressure sensor device is not critical to the damping by the mechanical springs.

A good quality factor improves the frequency resolution, as it gives a sharper peak. This extends the dynamic range of the pressure sensor to much lower pressures. A pressure sensitivity of the frequency shift of the order of $10^{-4}$/Pa can be achieved. This very high sensitivity (of $10^4$ ppm/mbar) depends on the pressure. For example the quality factor could limit the resolution of the peak in the frequency spectrum, for instance to about $10^{-6}$/Pa (100 ppm/mbar). This would imply that the pressure can be determined down to $10^{-2}$ mbar. With smaller gaps and MEMS release holes this can be further optimized to at least $10^{-3}$ mbar.

Surface micromachining improves the accuracy of manufacturing and therefore can improve the sensitivity to low pressure.

The pressure sensor of the invention is compatible with many microstructure layouts. Cheap processing in standard CMOS foundries is possible. As explained above, reliability testing with a standard product release test of six weeks (~1% of expected lifetime) is feasible The device can be made monolithic. As compared to assembled pressure sensors, the device then suffers less from temperature expansion, which could otherwise cause stress, resulting in a shift of resonant frequency.

As compared to membrane pressure sensors, the device of the invention offers the advantage that the performance does not suffer from layer stress and package stress as the sensitivity is limited by the designed suspension.

Even if a separate sensor is provided to the MEMS resonator device being monitored, CMOS integration is still feasible.

The response of the sensor is linear over the sub-millibar pressure range. The invention can be used in all types of vacuum equipment used for processing, research and fabrication.

At high pressures when the quality factor of the resonator becomes low and the resonance peak becomes too broad for a sensitive pressure measurement, the same device can be used as a Pirani element. The electrical resistance measurement may then serve for determining the pressure. The dynamic range then can be as high as five decades due to precise detection of frequency shift at low pressures and Pirani element at high pressure. Using a self heating current through the device, the temperature can be stabilised to reduce the sensitivity of the pressure sensor.

The pressure sensor can survive a sudden atmospheric pressure break by failure of the vacuum system. The resonant element of the pressure sensor can be immobilised to survive severe g-forces as experienced during space launch or in centrifuges. This immobilisation can be achieved by using an electronic feedback control loop that maintains the capacitance value of the sensing electrode to the sensing resonator, to keep the displacement constant. The response time can be of the order of microseconds to measure or control rapid transients in residual gas pressure, and the sensor can operate at ultra-low temperatures, due to the microwatt power consumption. The possible miniaturisation and low cost means that redundancy can be built in to a sensor head where maintenance is limited, such as in nuclear or space applications.

The invention provides a monolithic structure, for example formed using surface micromachined silicon substrates. A wet or dry etch of a buried oxide layer through the resonator openings performs a sacrificial etch process. The openings also provide an extra degree of freedom in the design of the resonator, and their design can be selected depending on whether the resonator is to operate in the squeeze film damping regime with pressure sensitive frequency shift, or in the amplitude sensitive regime. The number of holes can differ for the different functions.

Although separate devices can be provided for different functions, the dual use of one resonator element as cavity vacuum monitor and HF oscillator is of particular interest. The resonator element operated in the low frequency out-of-plane mode shape delivers excellent vacuum pressure-sensing capability for testing the cavity vacuum required for high frequency oscillator application. In the high frequency mode, the element is then operated in bulk mode shape. The device being fit for excitation of the out-of-plane mode shape enables wafer-level functional testing of the (dual use) resonator element by common testing instrumentation, such as an LCR meter.

Various modifications will be apparent to those skilled in the art.

The invention claimed is:

1. A MEMS pressure sensor for sensing the pressure in the vicinity of a MEMS device, comprising:
a monolithic resonant MEMS device having a pressure sensor resonator element which comprises an array of openings, wherein the resonant frequency of the resonant MEMS device is a function of the pressure in the vicinity of the pressure sensor with resonant frequency increasing with pressure, such that over the pressure range 0 to 0.1 kPa, the average relative change in frequency is at least $10^{-6}$/Pa.

2. A pressure sensor as claimed in claim 1, wherein the openings of the pressure sensor resonator element have a maximum opening dimension in the range 0.2 μm to 1 μm.

3. A pressure sensor as claimed in claim 1, wherein the openings of the pressure sensor resonator element have an average pitch in the range 5 μm to 20 μm.

4. A pressure sensor as claimed in claim 1, wherein the pressure sensor resonator element has a thickness in the range 1 μm to 3 μm and an area in the range 100 μm$^2$ to 40,000 μm$^2$.

5. A pressure sensor as claimed in claim 1, wherein over the pressure range 0 to 0.01 kPa, the average relative change in frequency is at least $10^{-6}$/Pa, preferably over the pressure range 0 to 0.001 kPa the average change in frequency is at least $10^{-6}$/Pa.

6. A pressure sensor as claimed in claim 1, wherein over the pressure range 0 to $10^{-5}$ kPa, the Q factor decreases monotonically with increasing pressure.

7. A pressure sensor as claimed in claim 1, further comprising means for measuring an electrical resistance of the pressure sensor resonator element to function as a Pirani element.

8. A pressure sensor as claimed in claim 1, wherein the resonant frequency is read out by piezo-resistive, capacitive or optical sensing methods.

9. A pressure sensor as claimed in claim 1 further comprising a PLL oscillator for tracking the resonant frequency and/or phase with changing pressure.

10. A pressure sensor as claimed in claim 1, wherein the pressure sensor resonator element (40) is in an open chamber for sensing ambient pressure in the vicinity of the chamber.

11. A MEMS device comprising a resonant device MEMS element within an encapsulated cavity and a pressure sensor as claimed in claim 1 for measuring the cavity pressure.

12. A device as claimed in claim 11, wherein a single MEMS resonator element is controlled to vibrate in a lateral mode to function as the device resonator element, and is controlled to vibrate in a vertical resonant mode to function as the pressure sensor resonant element.

13. A device as claimed in claim 12, wherein the resonator element when controlled to vibrate in a lateral mode comprises a bulk mode resonator functioning as a timing device or frequency reference.

14. A method of measuring a pressure below 0.1 kPa in the vicinity of a MEMS device, comprising:
monitoring the resonant frequency of a monolithic resonant MEMS device having a pressure sensor resonator element which comprises an array of openings, wherein the resonant frequency of the resonant MEMS device is a function of the pressure in the cavity with resonant frequency increasing with pressure, such that over the pressure range 0 to 0.1 kPa, the average relative change in frequency is at least $10^{-6}$/Pa.

15. A method of determining a defect in a MEMS device having a sealed cavity, comprising measuring the pressure in the sealed cavity using the method of claim 14.

* * * * *